(12) United States Patent
Tai et al.

(10) Patent No.: US 11,119,570 B1
(45) Date of Patent: Sep. 14, 2021

(54) METHOD AND SYSTEM OF MODIFYING POSITION OF CURSOR

(71) Applicant: XRSPACE CO., LTD., Taoyuan (TW)

(72) Inventors: Yu-Feng Tai, Keelung (TW); Sheng-Hsiu Kuo, Taipei (TW)

(73) Assignee: XRSPACE CO., LTD., Taoyuan (TW)

( * ) Notice: Subject to any disclaimer, the term of this patent is extended or adjusted under 35 U.S.C. 154(b) by 0 days.

(21) Appl. No.: 17/083,319

(22) Filed: Oct. 29, 2020

(51) Int. Cl.
*G06F 3/01* (2006.01)

(52) U.S. Cl.
CPC .................................. *G06F 3/011* (2013.01)

(58) Field of Classification Search
CPC ........... G06F 3/011; G06F 3/014; G06F 3/017
USPC ........................................................ 345/158
See application file for complete search history.

(56) References Cited

U.S. PATENT DOCUMENTS

| | | | | |
|---|---|---|---|---|
| 8,456,419 B2* | 6/2013 | Wilson | ................... | G06F 3/0346 345/158 |
| 10,373,381 B2* | 8/2019 | Nuernberger | ........... | G06T 19/20 |
| 2002/0175897 A1* | 11/2002 | Pelosi | ..................... | G01S 5/163 345/158 |
| 2009/0115784 A1* | 5/2009 | Tomite | ..................... | G06T 15/06 345/426 |
| 2012/0086637 A1* | 4/2012 | Ye | ......................... | G06F 3/0346 345/158 |
| 2012/0319949 A1* | 12/2012 | Lee | ......................... | G06F 3/0304 345/158 |
| 2016/0179188 A1* | 6/2016 | Grossinger | ............. | G06F 3/017 345/158 |
| 2018/0024647 A1* | 1/2018 | Coletrane-Pagan | .... | G06F 3/038 345/158 |
| 2018/0113599 A1 | 4/2018 | Yin | | |
| 2018/0286126 A1* | 10/2018 | Schwarz | ............. | G06F 3/04845 |

FOREIGN PATENT DOCUMENTS

| | | |
|---|---|---|
| CN | 107621883 | 1/2018 |
| TW | 201816549 | 5/2018 |
| TW | I662439 | 6/2019 |

* cited by examiner

*Primary Examiner* — Albert K Wong
(74) *Attorney, Agent, or Firm* — JCIP Global Inc.

(57) ABSTRACT

A method and a system for modifying the position of a cursor are provided. In the method, the depth information of a human body portion of a user is determined. The user uses the human body portion to move the cursor. The cursor is located at the end of a ray cast emitted from a user side, and the user's head wears a head mounted display. The first position of the cursor is determined. The second position of the cursor different from the first position is determined based on the depth information of the human body portion and the first position. The second position is used as the current position of the cursor, and the current position is located at the end of a ray cast emitted from the user currently. Accordingly, it is easy to control the cursor for different heights or arm lengths.

16 Claims, 4 Drawing Sheets

US 11,119,570 B1

METHOD AND SYSTEM OF MODIFYING POSITION OF CURSOR

BACKGROUND OF THE DISCLOSURE

1. Field of the Disclosure

The present disclosure generally relates to interactions in extended reality (XR), in particular, to a method and a system for modifying the position of cursor in the XR.

2. Description of Related Art

XR technologies for simulating senses, perception, and/or environment, such as virtual reality (VR), augmented reality (AR) and mixed reality (MR), are popular nowadays. The aforementioned technologies can be applied in multiple fields, such as gaming, military training, healthcare, remote working, etc.

In the XR, a user may interact with one or more objects and/or the environment. In general, the user may use his/her hands or a controller to change the field of view in the environment or to select a target object.

However, the body heights or arm lengths of different users may be different. For example, the arm length of an adult is longer than a child. The arm length may influence the user's experience for aiming the objects. The target plane of a target object would be the same for different users in the environment. If these users try to point the same target object, the positions of the cursor pointed by different users with different arm lengths may be different because of different swinging amplitudes.

SUMMARY OF THE DISCLOSURE

Accordingly, the present disclosure is directed to a method and a system for modifying the position of a cursor, to adapt different users for controlling the cursor.

In one of the exemplary embodiments, a method for modifying the position of the cursor includes, but is not limited to, the following steps. Depth information of a human body portion of a user is determined. The user uses the human body portion to move a cursor. The cursor is located at the end of a ray cast emitted from a user side, and the user's head wears a head mounted display. A second position of the cursor different from the first position is determined based on the depth information of the human body portion and the first position. The second position is used as the current position of the cursor, and the current position is located at the end of a ray cast emitted from the user currently.

In one of the exemplary embodiments, a system for modifying the position of the cursor includes, but is not limited to, a motion sensor, a memory, and a processor. The motion sensor is used for detecting the motion of a human body portion of a user. The memory is used for storing program code. The processor is coupled to the motion sensor and the memory and loading the program code to perform the following steps. Depth information of a human body portion of a user is determined. The user uses the human body portion to move a cursor. A second position of the cursor different from the first position is determined based on the depth information of the human body portion and the first position. The second position is used as the current position of the cursor, and the current position is located at the end of a ray cast emitted from the user currently.

It should be understood, however, that this Summary may not contain all of the aspects and embodiments of the present disclosure, is not meant to be limiting or restrictive in any manner, and that the invention as disclosed herein is and will be understood by those of ordinary skill in the art to encompass obvious improvements and modifications thereto.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DESCRIPTION OF THE EMBODIMENTS

Figure 1:
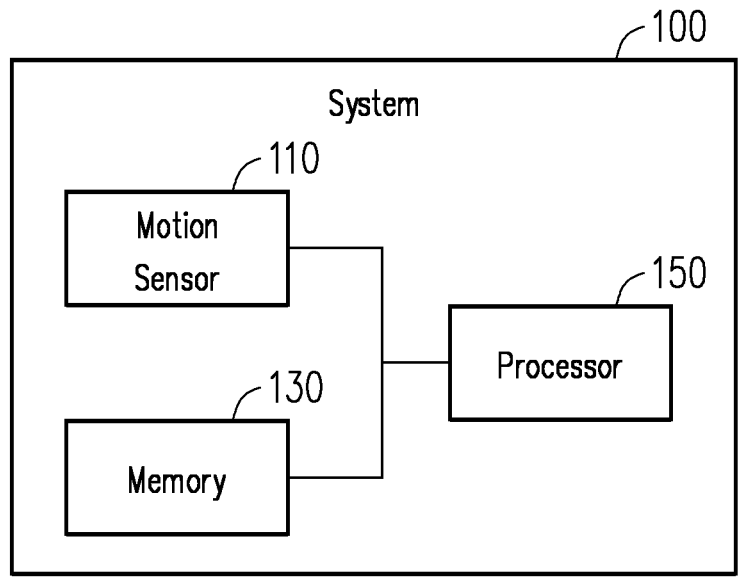
FIG. 1 is a block diagram illustrating a system for modifying the position of cursor according to one of the exemplary embodiments of the disclosure.

Reference will now be made in detail to the present preferred embodiments of the disclosure, examples of which are illustrated in the accompanying drawings. Wherever possible, the same reference numbers are used in the drawings and the description to refer to the same or like parts.

FIG. 1 is a block diagram illustrating a system for modifying the position of cursor according to one of the exemplary embodiments of the disclosure. Referring to FIG. 1, the system 100 includes, but not limited to, one or more motion sensors 110, a memory 130, and a processor 150. In one embodiment, the system 100 is a head mounted display (HMD) system, which is adapted for VR, AR, MR, or other reality simulation related technology.

The motion sensor 110 may be an accelerometer, a gyroscope, a magnetometer, a laser sensor, an inertial measurement unit (IMU), an infrared ray (IR) sensor, an image sensor, a depth camera, or any combination of aforementioned sensors. In one embodiment, the motion sensor 130 is used for sensing the motion of a user's human body portion (e.g., hands, legs, or arms), to generate motion sensing data from the sensing result of the motion sensor 110 (e.g. camera images, sensed strength values, etc.). For one example, the motion-sensing data comprises a 3-degree of freedom (3-DoF) data, and the 3-DoF data is related to the rotation data of the user's hand in three-dimensional (3D) space, such as accelerations in yaw, roll, and pitch. For another example, the motion-sensing data comprises a 6-degree of freedom (6-DoF) data. Comparing with the 3-DoF data, the 6-DoF data is further related to the displacement of the user's hand in three perpendicular axes, such as accelerations in surge, heave, and sway. For another example, the motion-sensing data comprises a relative position and/or displacement of the user's leg in the 2D/3D space. In some embodiments, the motion sensor 130 could be embedded in a handheld controller or a wearable apparatus acted with the user's human body portion, such as glasses, an HMD, or the likes.

The memory 130 may be any type of a fixed or movable random-access memory (RAM), a read-only memory (ROM), a flash memory, a similar device, or a combination of the above devices. The memory 130 records program codes, device configurations, buffer data, or permanent data (such as motion sensing data, positions, depth information, or planes), and these data would be introduced later.

The processor 150 is coupled to the motion sensor 110 and the memory 130. The processor 150 is configured to load the program codes stored in the memory 130, to perform a procedure of the exemplary embodiment of the disclosure.

In some embodiments, the processor 150 may be a central processing unit (CPU), a microprocessor, a microcontroller, a graphics processing unit (GPU), a digital signal processing (DSP) chip, a field-programmable gate array (FPGA). The functions of the processor 150 may also be implemented by an independent electronic device or an integrated circuit (IC), and operations of the processor 150 may also be implemented by software.

In one embodiment, an HMD or digital glasses includes the motion sensor 110, the memory 130, and the processor 150. In some embodiments, the processor 150 may not be disposed at the same apparatus with the motion sensor 110. However, the apparatuses respectively equipped with the motion sensor 110 and the processor 150 may further include communication transceivers with compatible communication technology, such as Bluetooth, Wi-Fi, and IR wireless communications, or physical transmission line, to transmit or receive data with each other. For example, the processor 150 may be disposed in an HMD while the motion sensor 110 is disposed at a controller outside the HMD. For another example, the processor 150 may be disposed in a computing device while the motion sensor 110 is disposed outside the computing device.

To better understand the operating process provided in one or more embodiments of the disclosure, several embodiments will be exemplified below to elaborate the operating process of the system 100. The devices and modules in the system 100 are applied in the following embodiments to explain the method for positioning a target point provided herein. Each step of the method can be adjusted according to actual implementation situations and should not be limited to what is described herein.

Figure 2:
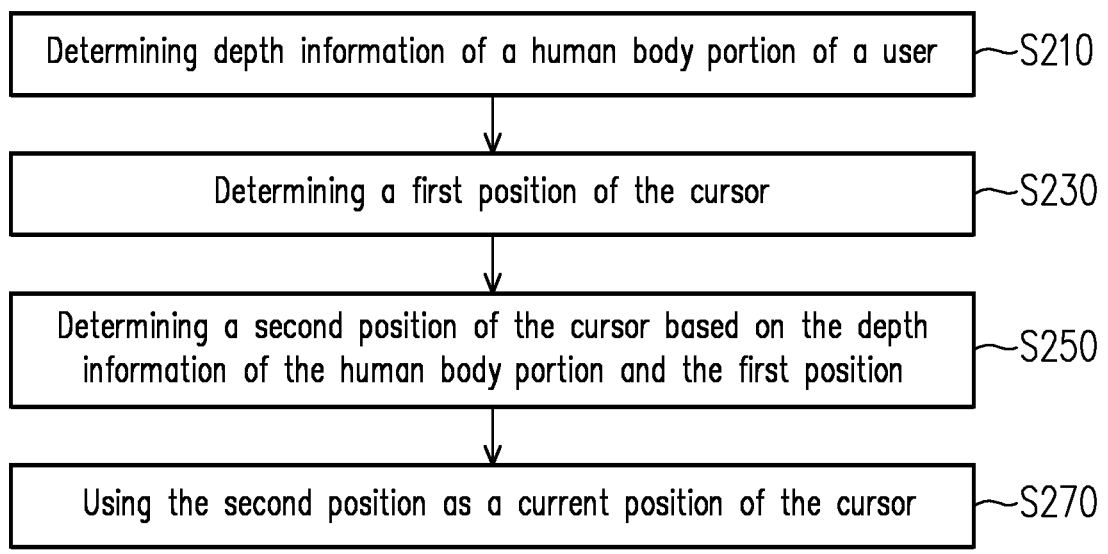
FIG. 2 is a flowchart illustrating a method for modifying the position of cursor according to one of the exemplary embodiments of the disclosure.

FIG. 2 is a flowchart illustrating a method for modifying the position of cursor according to one of the exemplary embodiments of the disclosure. Referring to FIG. 2, the processor 150 may determine depth information of a human body portion of a user (step S210) and determine a first position of the cursor (step S230). Specifically, it is assumed a user wears an HMD on his/her head. The user may use his human body portion (such as hand, arm, head, or leg) or the controller held by the human body portion to aim at a target object in the XR world. The processor 150 may determine the position of the human body portion or the position of the controller in the 3D space based on the motion of the human body portion of the user detected by the motion sensor 110. If the gesture of the user's hand is conformed to the predefined gesture for aiming object, the controller held by the human body portion moves, or other trigger conditions happens, a ray cast would be formed and emitted from the user side (such as the user's eye, the motion sensor 110, or other body portion of the HMD), and the ray cast may pass through the human body portion or the controller and further extend along with a straight line or a curve. If the ray cast collides with any object in the XR world, a cursor would be located at the end of the ray cast, and the end of the ray cast is located on the collided object. The location of the end of the ray cast on the collided object is called as the first position of the cursor.

Figure 3:
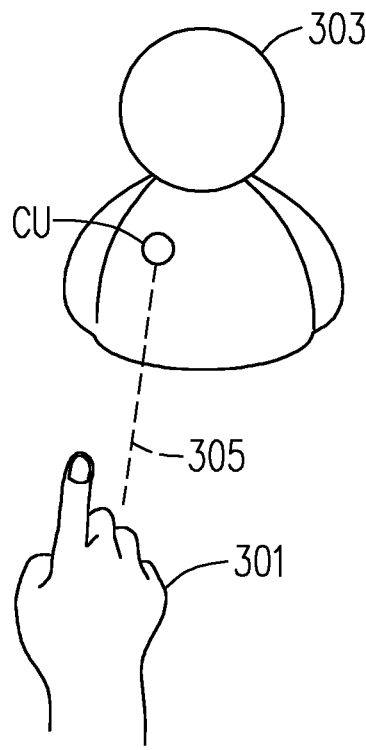
FIG. 3 is a schematic diagram illustrating the generation of a cursor according to one of the exemplary embodiments of the disclosure.

FIG. 3 is a schematic diagram illustrating the generation of a cursor CU according to one of the exemplary embodiments of the disclosure. Referring to FIG. 3, the one index finger up gesture of the user's hand 301 is conformed to the predefined gesture for aiming object, and the ray cast 305 emitted from the user's eye via the user's hand 301 is generated. The cursor CU would be located at the end of the ray cast 305. If the user moves his/her hand 301, the cursor CU also moves.

When the cursor is generated, the processor 150 may record the first position pointed by the human body portion of the user on a target plane in the XR world. The target plane is formed at a specific vertical distance relative to the user side, and the vertical distance equals to the distance between the user side and the target object in the XR world. The size of the target plane is determined based on the size of the target object. Furthermore, the form of the position may be the coordinates in two or three axes or a relative relation of other objects.

It should be noticed that the length of the human body portion or the position where the user stand may affect the motion of the cursor. Therefore, the depth information of the human body portion (such as the distance between the eyes and the hands or the depth of the hand relative to the HMD) would be one of the influence factors for the position of the cursor on the same target plane. The depth information of the human body portion would be used to compensate for the difference between different body heights or different arm lengths in the embodiments.

The processor 150 may determine a second position of the cursor based on the depth information of the human body portion and the first position (step S250). Specifically, as mentioned before, the first positions pointed by different users with different depth information of the human body portions may be different. In one embodiment, the second position of the cursor which represents the current position of the cursor should be the same as or near to other second positions of the cursors pointed by other users if these users try to point on the same target plane. Therefore, the first position pointed by the user may be modified, and the second position of the cursor would be determined as the modified position of the first position. That is, the second position of the cursor is different from the first position.

Figure 4:
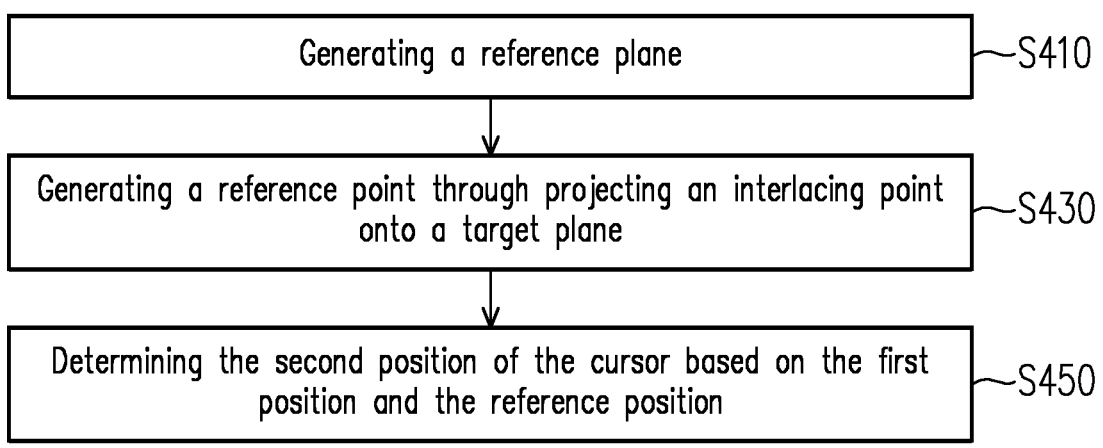
FIG. 4 is a flowchart illustrating the determination of the second position of the cursor according to one of the exemplary embodiments of the disclosure.
Figure 5:
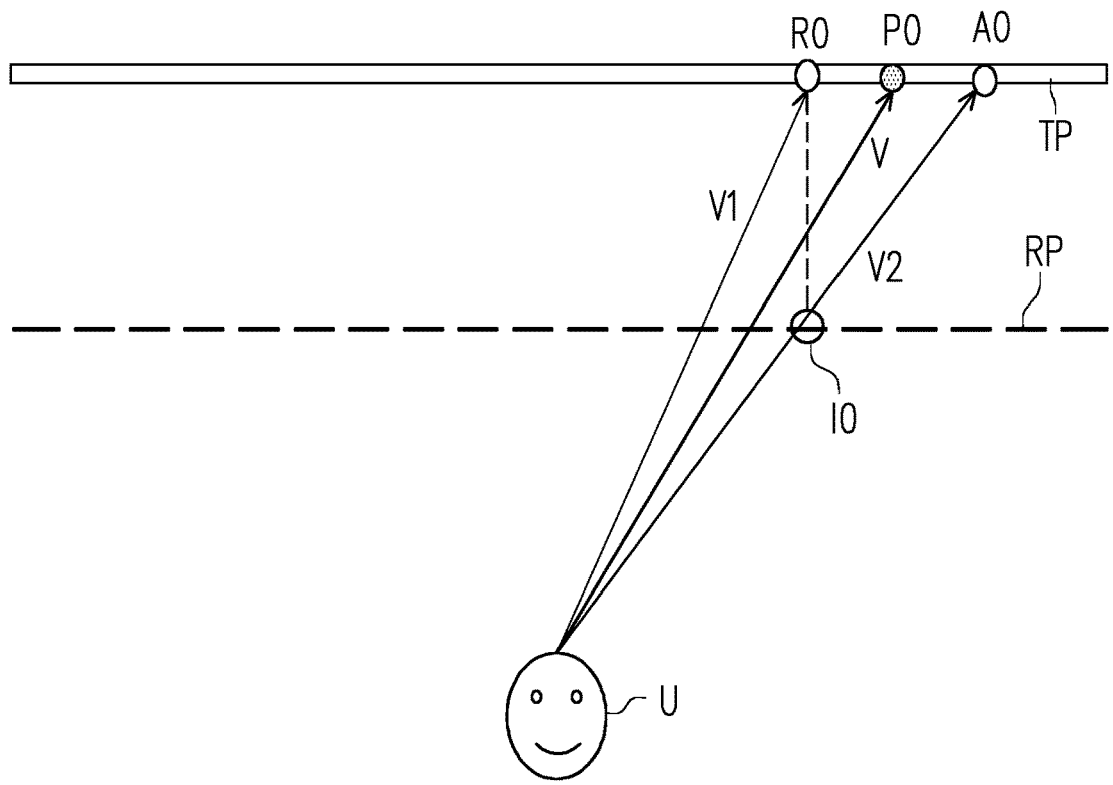
FIG. 5 is an example illustrating a top view of the determination of the second position of the cursor.

FIG. 4 is a flowchart illustrating the determination of the second position of the cursor according to one of the exemplary embodiments of the disclosure. Referring to FIG. 4, the processor 150 may generate a reference plane (step S410). There is a specific vertical distance between the reference plane and the user. For example, FIG. 5 is an example illustrating a top view of the determination of the second position P0 of the cursor. Referring to FIG. 5, the reference plane RP is located in front of the user U and parallel with the target plane TP. There is a vertical distance between the target plane TP and the user U, and there is another vertical distance between the reference plane RP and the user U.

Then, the processor 150 may generate a reference point through projecting a cross point onto the target plane (step S430). Taking FIG. 5 as an example, there is a cross point I0 located at the position where the ray cast emitted from the user U to the first position A0 is overlapped with the reference place RP. The processor 150 may project the cross point I0 on the target plane TP, and the projected position would be determined as the reference point R0.

The processor 150 may determine the second position P0 of the cursor based on the first position and the reference position (step S450). The first position of the cursor, the reference position of the reference point, and the second position of the cursor are located on the same target plane. In one embodiment, the processor 150 may determine the second position of the cursor based on a weighted relation of the first position and the reference position. The second position of the cursor would be located between the first position and the reference position based on the weighted relation. In one embodiment, the weighted relation would be the weighted calculation of the first position and the reference position. The weights of the first position and the reference position may vary based on the actual requirement.

In another embodiment, the processor 150 may generate an original point located at the user side. Taking FIG. 5 as an example, the original point is located at the eyes of user U. Furthermore, a first vector V1 is formed from the original position of the original point to the reference position R0, and a second vector V2 is formed from the original position to the first position A0.

Then, the processor 150 may determine a third vector formed from the original position to the second position of the cursor based on the first vector, the second vector, and the weighted relation. Taking FIG. 5 as an example, the weighted relation is:

$$V = \alpha V1 + \beta V2 \quad (1),$$

where α is the weight of the first vector V1, β is the weight of the second vector V2, and α+β=1. The third vector V is the weighted calculated result of the first vector V1 and the second vector V2. Then, the second position of the cursor is determined based on the third vector V. Taking FIG. 5 as an example, the second position P0 would be determined based on the function (1). The function of the second position P0 is:

$$\overrightarrow{OP0} = V3 \quad (2),$$

where O is the location of the eyes of user U.

Figure 6:
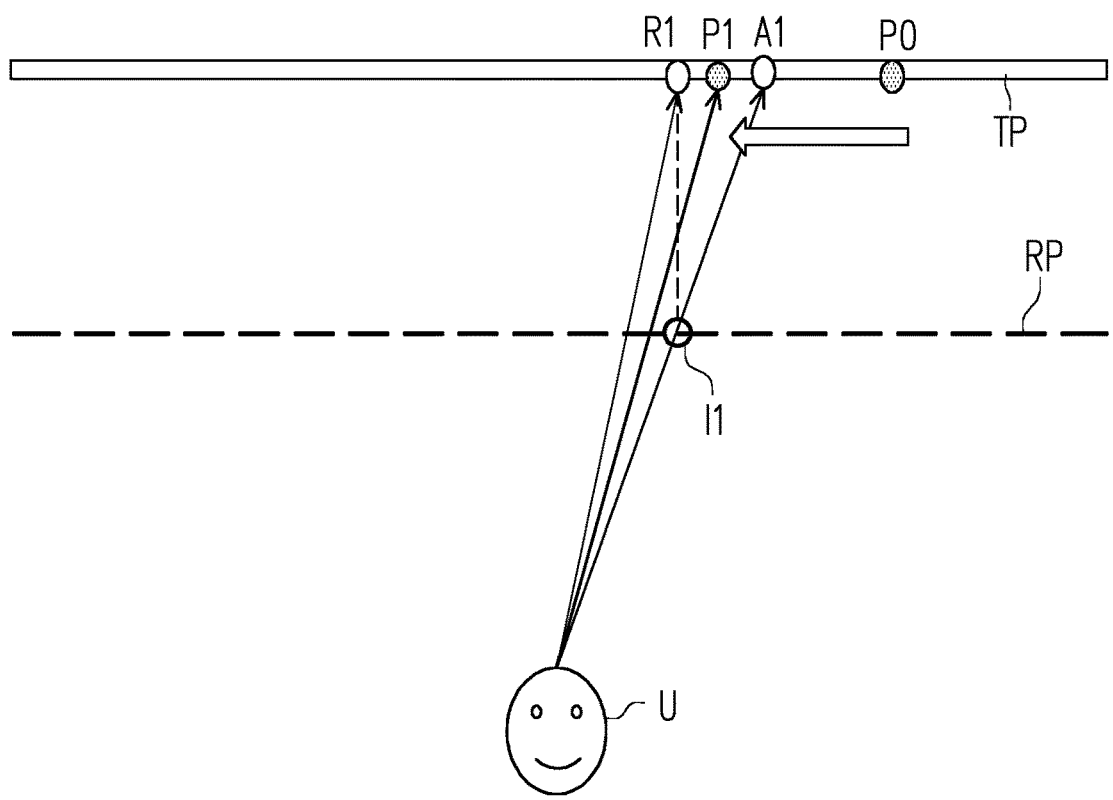
FIG. 6 is another example illustrating a top view of the determination of the second position of the cursor.

FIG. 6 is another example illustrating a top view of the determination of the second position P1 of the cursor. Referring to FIG. 6, if the user moves the human body portion, the first position P1 would be different from the first position P0 as shown in FIG. 5. There is a cross point I1 located at the position where the ray cast emitted from the user U to the first position A1 is overlapped with the reference place RP. The projected position of the cross point I1 on the target plane TP is the reference point R1. Then, the second position P1 would be determined based on the functions (1) and (2).

Figure 7:
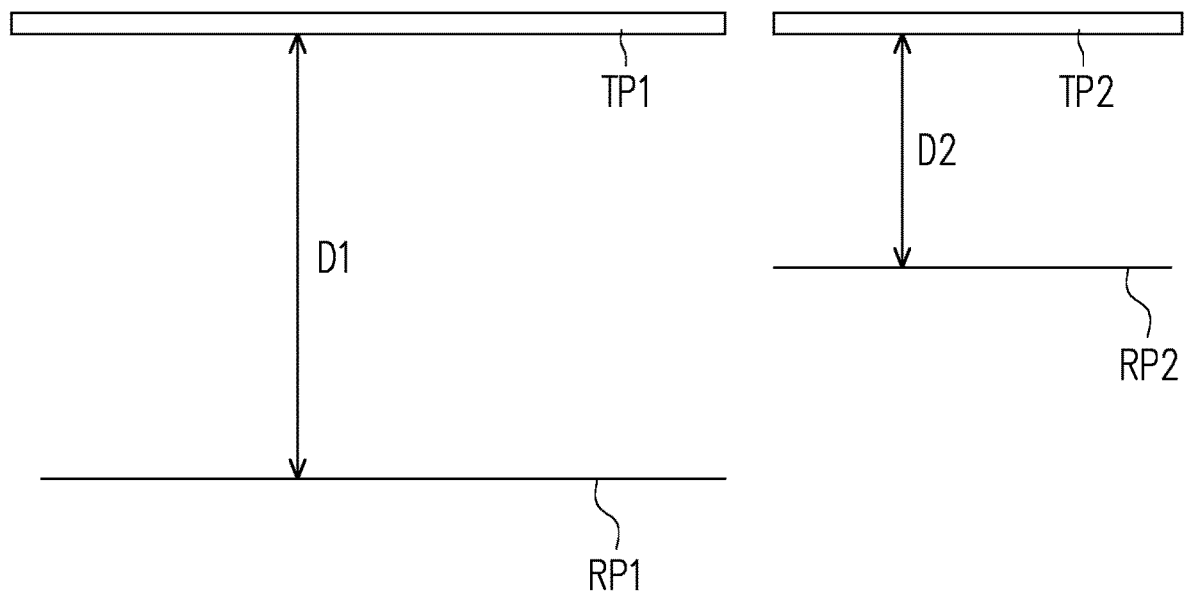
FIG. 7 is an example illustrating top views of target planes.

In one embodiment, the vertical distance between the target plane and the user may vary based on the scenario requirements in the XR world. That is, a third vertical distance from the reference plane to the target plane is determined based on the size of the target plane. For example, the scenario requirement relates to the size of the target plane. FIG. 7 is an example illustrating top views of target planes RP1 and RP2. Referring to FIG. 7, if the target plane TP1 is larger than the target plane TP2, the third vertical distance D1 between the target plane TP1 and the reference plane RP1 is longer than the third vertical distance D2 between the target plane TP2 and the reference plane RP2. Therefore, the user may reach the edge of the target plane TP1 by the cursor.

Figure 8:
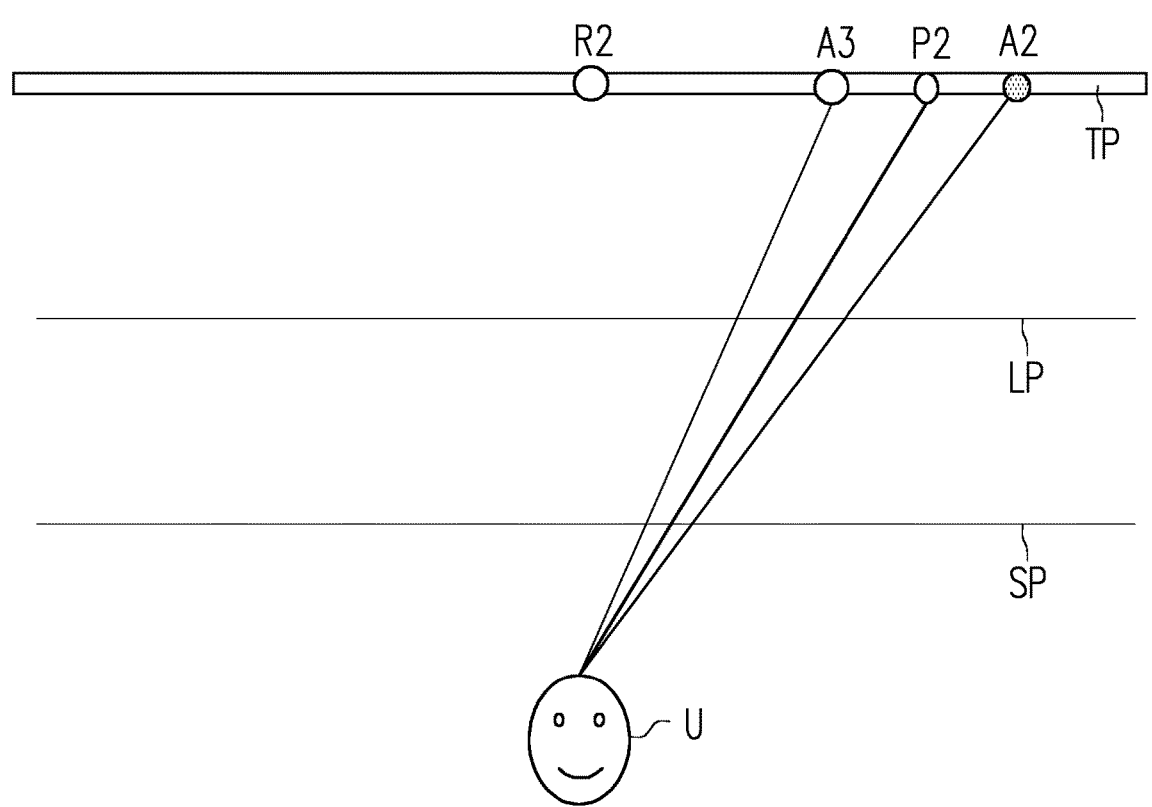
FIG. 8 is an example illustrating a top view of the determination of the second position of the cursor for different depths of the hands.

In one embodiment, the processor 150 may determine the length of the human body portion based on the depth information of the human body portion, and determine a modification value of the first position (i.e., the second position) based on the length of the human body portion. In this embodiment, the aforementioned reference plane may not be needed. The modification value is the spacing between the first position and the second position. If two users with different arm lengths stand at the same position, their swing amplitudes of the arms may be different. For example, FIG. 8 is an example illustrating a top view of the determination of the second position of the cursor for different depths of the hands. Referring to FIG. 8, there is a first swinging plane LP corresponding to the long arm of a user U, and there is a second swinging plane SP corresponding to the short arm of another user. The first positions A2 and A3 would be different. The processor 150 may determine the corresponding modification value for the first positions A2 and A3 by lookup table or function. The lookup table or the function records the relationship between the lengths of the human body portions and the modification values.

In one embodiment, if the length of the human body portion is larger than a length threshold, the processor 150 may determine the second position of the cursor is located at a position farther away from a second reference position relative to the first position. The second reference position is located at a projected position of the user on the target plane. That is, the second position is nearer to the second reference position relative to the first position. Taking FIG. 8 as an example, the second position P2 of the cursor modified from the first position A3 is farther away from the second reference position R2 relative to the first position A3.

In another embodiment, if the length of the human body portion is less than the length threshold, the processor 150 may determine the second position of the cursor is located at a position nearer to the second reference position relative to the first position. That is, the first position is nearer to the second reference position relative to the second position. Taking FIG. 8 as an example, the second position P2 of the cursor modified from the first position A2 is nearer to the second reference position R2 relative to the first position A2.

In some embodiments, the second position of the cursor may be determined based on the distance between the user and the target plane. For example, the second position may be located at the right of the first position if the user is near to the target plane, and the second position may be located at the left of the first position if the user stands away from the target plane.

Referring to FIG. 2, the processor 150 may use the second position as the current position of the cursor (step S270). That is, the second position, which represents the position of the end of the ray cast currently, is a modification of the first position. Then, the cursor would be shown on a display (such as LCD, LED display, or OLED display) at the second position but not the first position.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims and their equivalents.

What is claimed is:

1. A method for modifying position of cursor, comprising:
   determining depth information of a human body portion of a user, wherein the user uses the human body portion to move a cursor, the cursor is located at an end of a ray cast emitted from a user side, and the user's head wears a head mounted display;
   determining a first position of the cursor;
   determining a second position of the cursor based on the depth information of the human body portion and the first position, wherein the second position is different from the first position; and
   using the second position as a current position of the cursor, wherein the current position is located at the end of the ray cast emitted from the user side currently.

2. The method according to claim 1, wherein the step of determining the second position of the cursor comprises:
   generating a reference plane, wherein there is a first vertical distance between the reference plane and the user side;
   generating a reference point through projecting a cross point onto a target plane, wherein the cross point is located at a position where the ray cast is overlapped with the reference plane, there is a second vertical distance between the user side and the target plane, and the first position, a reference position of the reference point, and the second position are located one the target plane; and
   determining the second position of the cursor based on the first position and the reference position.

3. The method according to claim 2, wherein the step of determining the second position of the cursor based on the first position and the reference position comprises:
   determining the second position of the cursor based on a weighted relation of the first position and the reference position.

4. The method according to claim 3, wherein the step of determining the second position of the cursor based on a weighted relation of the first position and the reference position comprises:
   generating an original point located at the user, wherein a first vector is formed from an original position of the original point to the reference position, and a second vector is formed from the original position to the first position;
   determining a third vector formed from the original position to the second position of the cursor based on the first vector, the second vector, and the weighted relation, wherein the second position is determined based on the third vector.

5. The method for modifying position of cursor according to claim 2, wherein a third vertical distance from the reference plane to the target plane is determined based on a size of the target plane.

6. The method for modifying position of cursor according to claim 2, wherein the first vertical distance varies based on scenario requirement in extended reality (XR).

7. The method according to claim 1, wherein the step of modifying the current position pointed by the human body portion of the user comprises:
   determining a length of the human body portion based on the depth information of the human body portion; and
   determining a modification value of the first position based on the length of the human body portion, wherein the modification value is the spacing between the first position and the second position.

8. The method according to claim 7, wherein the step of modifying the first position pointed by the human body portion of the user comprises:
   determining the second position of the cursor is located at a position farther away from a second reference position relative to the first position in response to the length of the human body portion being less than a length threshold, wherein the second reference position is located at a projected position of the user on a target plane, there is a third vertical distance between the user and the target plane, and the first position, the second reference position, and the second position are located on the target plane; and
   determining the second position of the cursor is located at a position nearer to the second reference position relative to the first position in response to the length of the human body portion being larger than the length threshold.

9. A system for modifying position of cursor, comprising:
   a motion sensor, detecting a motion of a human body portion of a user; and
   a memory, storing a program code; and
   a processor, coupled to the motion sensor and the memory, and loading the program code to perform:
      determining depth information of the human body portion of the user, wherein the user uses the human body portion to move a cursor, the cursor is located at an end of a ray cast emitted from a user side, and the user's head wears a head mounted display;
      determining a first position of the cursor;
      determining a second position of the cursor based on the depth information of the human body portion and the first position, wherein the second position is different from the first position; and
      using the second position as a current position of the cursor, wherein the current position is located at the end of the ray cast emitted from the user side currently.

10. The system according to claim 9, wherein the processor further performs:
    generating a reference plane, wherein there is a first vertical distance between the reference plane and the user side;
    generating a reference point through projecting a cross point onto a target plane, wherein the cross point is located at a position where the ray cast is overlapped with the reference plane, there is a second vertical distance between the user side and the target plane, and the first position, a reference position of the reference point, and the second position are located on the target plane; and
    determining the second position of the cursor based on the first position and the reference position.

11. The system according to claim 10, wherein the processor further performs:
    determining the second position of the cursor based on a weighted relation of the first position and the reference position.

12. The system according to claim 11, wherein the processor further performs:
    generating an original point located at the user, wherein a first vector is formed from an original position of the original point to the reference position, and a second vector is formed from the original position to the first position;

determining a third vector formed from the original position to the second position of the cursor based on the first vector, the second vector, and the weighted relation, wherein the second position is determined based on the third vector.

13. The system according to claim 10, wherein a third vertical distance from the reference plane to the target plane is determined based on a size of the target plane.

14. The system according to claim 10, wherein the first vertical distance varies based on scenario requirement in extended reality (XR).

15. The system according to claim 9, wherein the processor further performs:

determining a length of the human body portion based on the depth information of the human body portion; and determining a modification value of the first position based on the length of the human body portion, wherein the modification value is the spacing between the first position and the second position.

16. The system according to claim 15, wherein the processor further performs:

determining the second position of the cursor is located at a position farther away from a second reference position relative to the first position in response to the length of the human body portion being larger than a length threshold, wherein the second reference position is located at a projected position of the user on a target plane, there is a third vertical distance between the user and the target plane, and the first position, the second reference position, and the second position are located on the target plane; and determining the second position of the cursor is located at a position nearer to the second reference position relative to the first position in response to the length of the human body portion being less than the length threshold.

* * * * *